Figure 1:
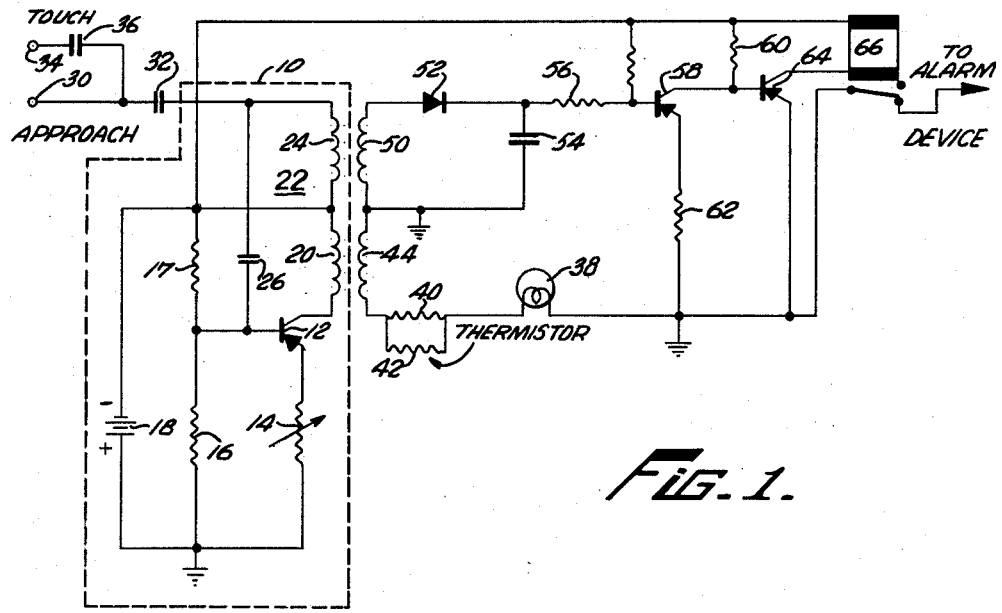

April 14, 1964  W. E. McKNIGHT  3,129,415
PROXIMITY DETECTOR
Filed Jan. 3, 1961

INVENTOR.
WILLIAM EARLE McKNIGHT
BY
Christie, Parker & Hale
ATTORNEYS.

3,129,415
PROXIMITY DETECTOR
William Earle McKnight, San Fernando, Calif., assignor, by mesne assignments, to Westinghouse Electric Corporation, a corporation of Pennsylvania
Filed Jan. 3, 1961, Ser. No. 80,299
8 Claims. (Cl. 340—258)

This invention relates to proximity detectors, and more particularly, is concerned with a device for sensing the approach of a foreign object, such as an intruder, into a protected region.

In burglar alarm systems, safety devices, and the like, it is desirable to be able to sense the approach of a foreign object into a protected region. It is frequently desirable that the detection of the foreign object be made without physical contact. Circuits for sensing the approach or closeness of an object are referred to as proximity detectors. While proximity detector circuits have been developed which operate in a variety of ways to detect the presence of an object, the system which works by sensing the change of capacitance to ground caused by the approach of an object to an antenna has proved particularly useful, since it does not require the object to be metallic or magnetic and does not require the radiation of energy, such as is required in radio frequency detectors, infra-red or visual light systems.

One of the difficulties encountered with variable capacitance type proximity detectors results from the fact that the change in capacitance produced by the presence of a foreign object may be extremely small. In order to achieve high sensitivity such circuits require an extremely critical adjustment so as to be triggered by very small changes in capacitance of the sensing antenna. However, any type of antenna is subject to rather large changes in capacitance due to environmental conditions. For example, the dielectric constant of air changes considerably with its moisture content. Thus where a wire antenna is used and its capacitance to ground is measured to detect changes in that capacitance due to the presence of a foreign object in the vicinity of the antenna, mere changes in the moisture content of the air may change the capacitance sufficiently to set off the detector. Thus to achieve reasonable sensitivity, it has been necessary to adjust such known proximity detector circuits frequently to maintain the circuit at its critical operating condition.

In addition to frequent adjustments to correct changes in environmental condition, prior art proximity detectors have been limited in the length of antenna which could be used. Obviously, the longer the antenna, the larger total capacitance of the system. The larger the input capacitance of the system, the smaller the percentage change in capacitance produced by a foreign object such as an intruder. Heretofore, proximity detectors of the capacitance sensing type have not been sensitive enough to operate with antennas of any great length.

The present invention provides a proximity detector which senses the change of capacitance to ground of an antenna when a foreign object such as an intruder moves into the region of the antenna. The present invention has the advantage that it provides extreme sensitivity to small changes in the capacitance of the antenna. It automatically compensates for changes in ambient conditions. Because of its high sensitivity, the detector can be used with antennas of several hundred feet in length. At the same time, the detector of the present invention is highly stable over a wide range of changing ambient conditions, ensuring against undesirable false alarm conditions.

In brief, the proximity detector of the present invention comprises a sensitive oscillator circuit of the feedback type. An antenna is coupled to the feedback network in such a way that capacitance of the antenna modifies the feedback and interrupts the oscillation of the oscillator circuit. A relay circuit controlled by the signal generated by the oscillator provides a warning indication when oscillation ceases. A compensating circuit is coupled to the oscillator which is responsive to changes in the amplitude of oscillation for automatically changing the operating condition of the oscillator to maintain it in critical adjustment. The compensating circuit has a slow time response so that it is unaffected by rapid changes in the condition of the oscillator produced by movement of an object into the region of the antenna.

Figure 2:
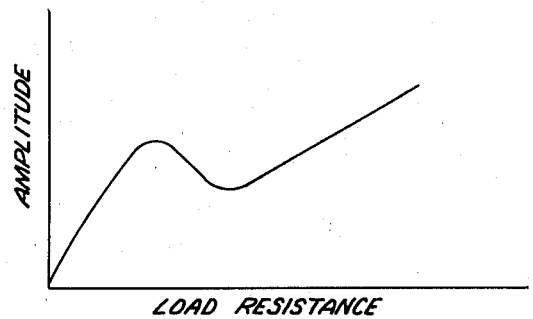

For a more complete understanding of the invention, reference should be had to the accompanying drawing wherein:

FIGURE 1 is a schematic diagram of the preferred embodiment of the present invention; and FIGURE 2 is a graphical representation of the touching effect.

Referring to the drawing in detail, the numeral 10 indicates generally the feedback oscillator circuit which comprises a transistor 12 having the emitter electrode connected to ground through a variable resistor 14. The base electrode is connected to a biasing voltage divider including resistors 16 and 17 connected in series across a grounded potential source 18.

A negative voltage from the potential source 18 is applied to the collector electrode of the transistor 12 through an inductance coil 20 which is part of an air core transformer indicated generally at 22. Regenerative feedback is provided through a series resonant circuit including an inductance 24 and capacitance 26, the inductance 24 being part of the transformer 22 and being coupled by mutual inductance to the coil 20.

An antenna in the form of a long length of wire (not shown) is connected to a terminal 30. The antenna may be as much as 300 feet in length. Terminal 30 is coupled through a capacitor 32 to the series junction point between the feedback inductance 24 and the capacitance 26. Where direct contact is required to set off the alarm, an electrode (not shown) may be connected to a terminal 34 which is connected through a capacitor 36 to the capacitor 32. The electrode may be in the form of a metal filing cabinet, a group of storage bins, or the like. Because direct contact provides a much larger change in capacitance, sensitivity can be reduced by insertion of the series capacitor 36.

A compensating load circuit is provided in the form of a tungsten filament bulb 38 connected in series with a resistor 40 and a thermistor element 42 across a secondary winding 44 of the transformer 22. The resistor 40 and the thermistor 42 are selected such that the tungsten filament bulb 38 operates at a temperature of the order of 15 C.° above ambient when the oscillator is operating normally.

The compensating circuit provides a heavy load on the oscillator such that the oscillator is loaded almost to the point of extinction. It has been found that with the bias resistor 14 critically adjusted so that the gain of the transistor stage is just sufficient to sustain oscillation, that the amplitude of oscillation varies with the resistance in the manner indicated in FIGURE 2. It will be noted there is a region in which an increase in load resistance decreases the amplitude of oscillation. The compensating load circuit is the preferred embodiment with the tungsten filament bulb, designed to operate in this region of negative slope of the curve shown in FIGURE 2. The tungsten bulb 38 has a positive temperature characteristic, that is, its resistance increases with temperature. As the amplitude of oscillation increases, the current in the compensating load circuit increases causing the filament to increase in resistance. By operating in the negative slope region, this results in a decrease in amplitude of the oscillations of the feedback oscillator 10. The thermistor provides compensation for long term changes in ambient temperature which affect the tungsten filament bulb 38.

It should be noted that the compensating circuit may be designed to use a resistance material having a negative temperature characteristic by operating the load circuit in the higher resistance region where amplitude increases with load resistance. However, the circuit has given superior results when the preferred embodiment is employed.

The circuit as thus far described is extremely sensitive to sudden small changes in the capacitance to ground of the terminal 30. With the oscillator circuit adjusted almost to the point of extinction by the resistor 14, any small increase in the capacitance to ground of the feedback network stops oscillation. However, any long term changes in the capacitance to ground produce only a gradual decrease in the amplitude of oscillation which is compensated for by the load network. The time constant of the load network is of the order of two seconds. For example, a step change of only .03% in the variable resistor 14 can stop oscillation, whereas it can be changed slowly of the order of 5% to change in resistance without stopping oscillation, due to the effect of the compensating circuit.

An alarm sounding circuit includes a secondary winding 50 inductively coupled to the winding 24 of the transformer 22. The signal developed across the winding 50 is rectified by diode 52 and filtered by a low pass filter including a capacitor 54 and resistor 56. The resulting D.C. signal is applied to the base of a single stage transistor amplifier including a transistor 58 having its collector electrode connected to the negative potential source 18 through a resistor 60, and having its emitter electrode connected to ground through a bias resistor 62. The collector electrode is connected to the base of a grounded emitter transistor switch including a transistor 64 whose collector is connected through the coil of a relay 66 to the negative side of the potential source 18.

With the oscillator putting out a signal, the transistors are both biased conductive, energizing the relay 66. Whenever the oscillator stops oscillating, the relay 66 drops out, completing a circuit to a suitable alarm device (not shown).

From the above description it will be recognized that a capacitance sensitive switch is provided which is extremely sensitive to small step changes in the capacitance but which is relatively insensitive to long term changes in capacitance. The circuit can be used with a variety of antenna lengths and types and is stable over a wide range of varying ambient conditions, as long as the changes do not occur faster than the time response of the automatic compensating circuit. A single wire antenna up to 300 feet in length may be employed or relatively large masses may be employed as antennas such as metal objects including desks, filing cabinets, bookcases, and the like.

What is claimed is:

1. A proximity detector comprising a feedback oscillator circuit including a transistor, a center-tapped winding having inductance connected at one end to the collector electrode of the transistor, a feedback capacitor connecting the other end of the winding to the base electrode of the transistor, a voltage divider connected across a potential source, one end of the voltage divider being connected to the center-tap of the winding, a tap on the voltage divider being connected to the base electrode and a variable resistor connecting the emitter electrode to the other end of the voltage divider; a compensating load circuit including a winding inductively coupled to the winding in the oscillator circuit, a tungsten filament bulb connected across the winding, the bulb having a resistance that varies with the temperature, and ambient temperature compensating means connected in circuit relation with said bulb; and an antenna including a length of wire and a blocking capacitor connecting one end of the wire to said other end of the winding in the oscillator circuit.

2. Apparatus as defined in claim 1 further comprising means for indicating the presence of an object in the proximity of said antenna including an amplifier inductively coupled to the winding in the oscillator circuit, and a relay driven by the amplifier, whereby the relay is actuated when the oscillator starts oscillating, said relay including means to operate said indicating means.

3. A proximity detector comprising a feedback oscillator circuit including an amplifier stage and series resonant inductance-capacitance feedback network; a compensating load circuit including a winding inductively coupled to the inductance in the oscillator circuit, and an impedance including ambient temperature compensating means connected across the winding, the impedance having a resistance that varies with the ambient temperature and an element having a thermal time lag and resistance dependent on its temperature, the said element conducting the oscillating current as part of said compensating load and said current determining the temperature of said element and setting its resistance to compensate for changes in the amplitude of oscillation; and an antenna connected to the series junction of the inductance and capacitance of the feedback network.

4. A proximity detector comprising an oscillator, an antenna coupled to the oscillator, the amplitude of oscillation of the oscillator being responsive to changes in the capacitance of the antenna, said oscillator including means setting said oscillator so that it is just in a state of oscillation such that a small abrupt change of a predetermined sense in the capacitance of said antenna stops oscillation, a compensating circuit including an element having a thermal time lag and resistance dependent on its temperature connected to load the oscillator, the said element changing resistance as its temperature changes in response to changes in the amplitude of oscillations to maintain said oscillations at a constant amplitude, the compensating circuit having a substantial time lag compared to the duration of said abrupt change so that slow changes in antenna capacitance are compensated for, but said abrupt change in antenna capacitance is not compensated for, and means controlled by the oscillator responding differently when said oscillator is oscillating and when said oscillator is not oscillating.

5. A circuit comprising a feedback oscillator normally biased to oscillate, said oscillator including means setting the feedback gain of said oscillator so that said gain is just sufficient to sustain oscillation, a variable capacitance element coupled in feedback gain controlling relationship to the oscillator for stopping oscillation of the oscillator when the capacitance of said element is increased abruptly by a small magnitude, and a compensating network having a long time constant compared to the duration of said abrupt change coupled to the oscillator, the said network including an element having a thermal time lag and resistance dependent on its temperature connected to load the oscillator, the said element changing resistance as its temperature changes in response to changes in the amplitude of oscillations, the said network modifying the oscillator to sustain oscillations with slow increases in the variable capacitance, said network also including resistance means for compensating for changes in ambient temperatures, whereby the circuit is sensitive to the rate at which the capacitance of said element is increased.

6. A proximity detector including an oscillator, an antenna, capable of changing its impedance responsive to the presence of a foreign object in the region of said antenna, coupled to said oscillator in controlling relationship with said oscillator, said oscillator including means setting said oscillator just in the state of oscillation so that a small abrupt change of a predetermined sense in said impedance stops oscillation of said oscillator, a compensating circuit including an element having a thermal time lag and resistance dependent on its temperature connected to load the oscillator, the said element changing resistance as its temperature changes in response to changes in the amplitude of oscillations to maintain said amplitude substantially constant, said compensating circuit operating with substantial time lag compared to the duration of said abrupt change so that gradual changes in said impedance are compensated for but said abrupt change is not compensated for, and means connected to said oscillator for indicating whether or not said oscillations are present.

7. A proximity detector including an oscillator, an antenna, capable of changing its impedance responsive to the presence of a foreign object in the region of said antenna, coupled to said oscillator in controlling relationship with said oscillator, said oscillator including means setting said oscillator just in the state of oscillation so that a small abrupt change of a predetermined sense in said impedance stops oscillation of said oscillator, a compensating circuit coupled to said oscillator in oscillator-loading relationship, said oscillator and compensating circuit having a load characteristic such that said oscillator oscillates in the region of its amplitude-load-resistance characteristic where the amplitude varies inversely with the load resistance, said compensating circuit including temperature dependent resistance means conducting the oscillator current and said current determining the temperature thereof, said resistance means having a time lag and also having a positive temperature coefficient of resistance whereby said compansating circuit responds to changes in the amplitude of said oscillation to maintain said amplitude substantially constant, said compensating circuit operating with substantial time lag compared to the duration of said abrupt change so that gradual changes in said impedance are compensated for but said abrupt change is not compensated for, and means connected to said oscillator for indicating whether or not said oscillations are present.

8. A proximity detector including an oscillator, an antenna, capable of changing its impedance responsive to the presence of a foreign object in the region of said antenna, coupled to said oscillator in controlling relationship with said oscillator, said oscillator including means setting said oscillator just in the state of oscillation so that a small abrupt change of a predetermined sense in said impedance stops oscillation of said oscillator, a compensating circuit coupled to said oscillator in oscillator loading relationship, said oscillator and compensating circuit having a load characteristic such that said oscillator oscillates in the region of its amplitude-load-resistance characteristic where the amplitude varies directly with the load resistance, said compensating circuit including temperature dependent resistance means conducting the oscillator current and said current determining the temperature thereof, said resistance means having a time lag and also having a negative temperature coefficient of resistance whereby said compensating circuit responds to changes in the amplitude of said oscillation to maintain said amplitude substantially constant, said compensating circuit operating with substantial time lag compared to the duration of said abrupt change so that gradual changes in said impedance are compensated for but said abrupt change is not compensated for, and means connected to said oscillator for indicating whether or not said oscillations are present.

References Cited in the file of this patent
UNITED STATES PATENTS

| | | |
|---|---|---|
| 2,421,771 | Browning | June 10, 1947 |
| 2,422,542 | Gustafsson | June 17, 1947 |
| 2,640,978 | Claesson et al. | June 2, 1953 |
| 2,673,340 | Johansson et al. | Mar. 23, 1954 |
| 2,764,643 | Sulzer | Sept. 25, 1956 |
| 2,798,953 | Fisher | July 9, 1957 |
| 2,807,720 | Charles | Sept. 24, 1957 |
| 2,907,017 | Cowen | Sept. 29, 1959 |
| 2,919,413 | Charles | Dec. 29, 1959 |
| 2,943,304 | Schmidt | June 28, 1960 |
| 3,032,722 | Banasiewicz | May 1, 1962 |
| 3,051,932 | Cressey et al. | Aug. 28, 1962 |